Jan. 25, 1955
J. J. TEPAS, JR., ET AL
2,700,651
CHEMICAL FEEDER
Filed May 2, 1951
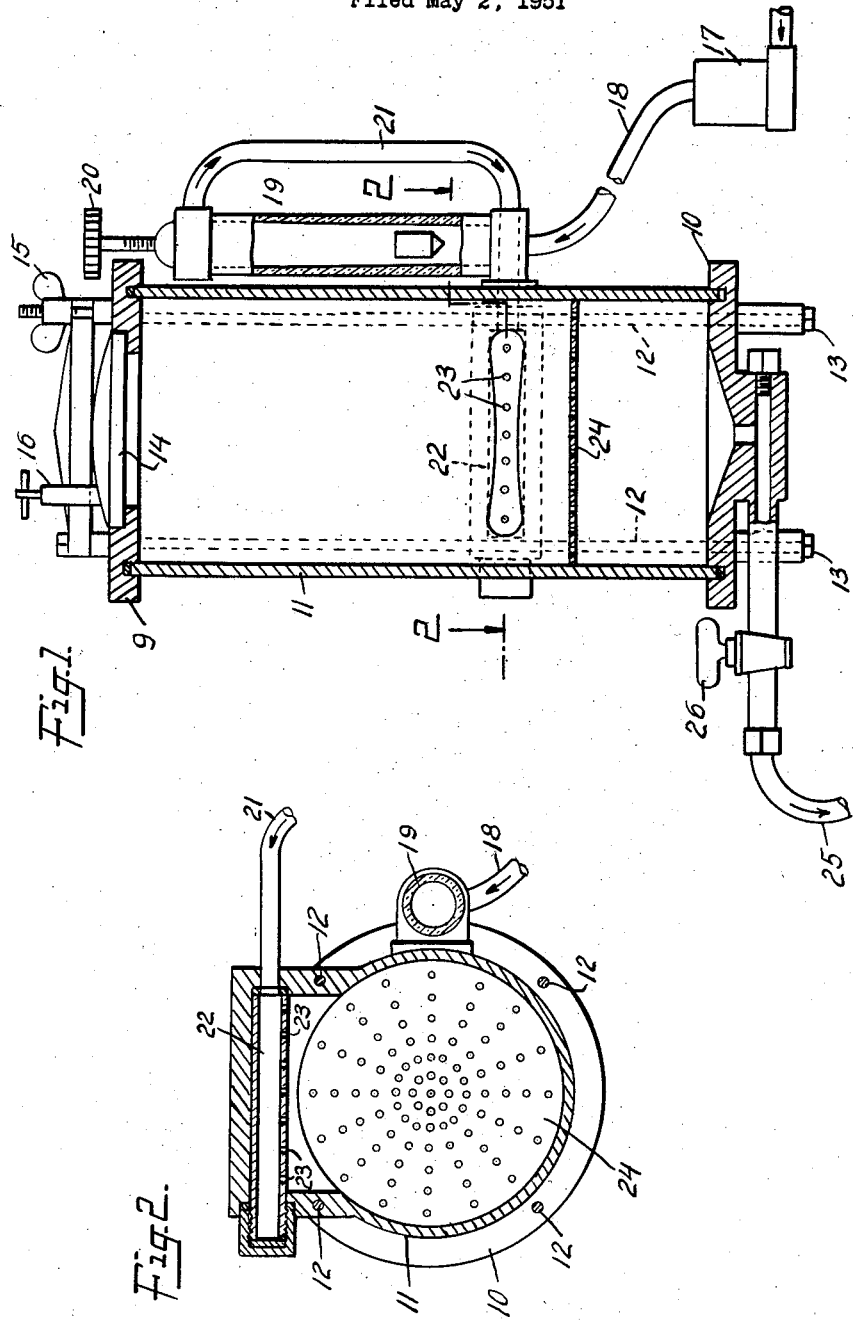
INVENTORS
JOSEPH J. TEPAS, JR.
GERARD C. SMITH
BY
Adams, Forward and McLean
ATTORNEYS

United States Patent Office 2,700,651
Patented Jan. 25, 1955

2,700,651
CHEMICAL FEEDER

Joseph J. Tepas, Jr. and Gerard C. Smith, Baltimore, Md., assignors to Olin Mathieson Chemical Corporation, a corporation of Virginia Application May 2, 1951, Serial No. 224,240

1 Claim. (Cl. 210—28)

This invention relates to apparatus for preparing and feeding aqueous solutions of controlled concentration from solid hypochlorite. More particularly, it relates to apparatus for supplying solutions of low controlled concentrations from calcium hypochlorite in conveniently handled pressed or tableted form at accurately controlled rates for consumption in a variety of chlorination and water treating applications differing widely in the ultimate concentration of solution required.

In the treatment of water supplies, a supply of aqueous solution of a hypochlorite is commonly metered into a flowing body of the liquid to be treated. Such practice requires the purchase of solutions of hypochlorite or requires the preparation of a stock solution from a dry hypochlorite at the point of use. Sodium hypochlorite known in the solid state only as the pentahydrate, a very unstable compound, is prepared commercially as solutions not exceeding 15% available chlorine, which solutions deteriorate quickly during shipment and storage and are generally available only in the vicinity of plants in which they are prepared. Calcium hypochlorite, on the other hand, particularly in the form of high test hypochlorite, can be shipped as a relatively stable solid containing 70% or more of available chlorine and may be conveniently stored for long periods of time without appreciable loss of available chlorine.

In spite of the above and other advantages of solid calcium hypochlorite for use as a sterilizing agent, there is the problem of applying the solid in such a manner that only a few parts per million of available chlorine will ultimately be present in the water or other liquid to be treated, which remains the chief reason for the continued use of sodium hypochlorite solutions. In the conventional method of application, for example to the circulating system of a swimming pool, the solid calcium hypochlorite is dissolved in water to form a supply or stock solution of desired concentration which is metered by a sensitive metering device into the circulating system at a rate that will maintain residual chlorine of 0.3 to 0.6 p. p. m. in the pool. However in the conventional method of application there is the difficulty of sludge formation in making up the stock solutions. The presence of sludge in the hypochlorite solutions tends to clog the sensitive metering devices necessary to supply the calcium hypochlorite solution in small amounts to the body of liquid to be treated. Consequently it is often necessary to filter or otherwise separate the sludge from the calcium hypochlorite solution prior to passing the solution through the metering device.

With the apparatus of our invention a material in solid particulate form, such as calcium hypochlorite, may be effectively and continuously dissolved at variable but accurately controllable rates and the resulting solutions, covering a wide range of available chlorine dispensations, may be supplied without further treatment to the point of ultimate consumption.

In general the apparatus of the present invention comprises a vertically enlarged container with an upper opening for charging the solid hypochlorite and a lower opening for withdrawing aqueous hypochlorite, a perforated support for a bed of the solid hypochlorite arranged within said container and above its base, distributing means set above said perforated support and containing a plurality of parallel openings for introducing fine parallel streams of water horizontally into said container and distributing it throughout the lower portion of the hypochlorite bed, means for metering variable amounts of water to said distributing means, and means for withdrawing and dispensing aqueous hypochlorite solution of desired concentration from said lower opening.

In operation water is metered at an accurately controllable but variable rate to the distributing device set in the side of the container and distributed into the lower fraction of the bed of calcium hypochlorite charge. The charge is dissolved by the water and the solution so formed passes through the perforated support for the charge, through the exit in the container, through the dispensing means, and into the flowing or circulating body of liquid to be treated. The bed of calcium hypochlorite charge in the lower portion of the container is replaced as dissolved by the charge descending by its own weight from the upper section of the container. Thus the apparatus of the present invention provides means for dissolving calcium hypochlorite in tableted form at variable but accurately controllable rates at which available chlorine is required for treatment of water and dispenses with the necessity of preparing large quantities of stock solutions of calcium hypochlorite. Furthermore, the apparatus of the present invention has the important advantage of permitting control of the flow rate of the calcium hypochlorite solution into the body of liquid to be treated by metering the water instead of by metering the calcium hypochlorite solution. The problem of sludge removal to prevent clogging of the metering equipment is thereby eliminated since the sludge flows freely into the body of liquid to be treated where it is dissolved.

In any system where water is supplied under pressure, or is being circulated by a pump, the installation of the present apparatus requires only a connection for the inflow water to the high pressure side of the system and a connection for introducing the resulting solution at a low pressure point in the system.

A useful feeder exemplifying our invention is illustrated somewhat diagrammatically in the accompanying drawings in which:

Fig. 1 is a vertical cross-section of a feeder employing the principles of our invention.

Fig. 2 is a view taken at line 2—2 of Fig. 1 showing the device utilized for introducing and distributing the water into the bed of calcium hypochlorite.

The arrangement shown in the accompanying drawings was designed to best suit the needs of a specific application and is in no way meant to express or imply a limitation or restriction on the design.

As Fig. 1 shows, the apparatus consists of a top 9, bottom 10, and center section 11, which are held together by tie-rods 12 and nuts 13. A lid 14 held firmly in place by wing nut 15 and conveniently provided with a vent 16 affords a convenient means of charging the chemical through the top 9.

In operation, water is advantageously filtered through a suitable strainer 17 and supplied to the feeder through line 18, at a rate which is measured by a flowmeter 19, and controlled by a suitable needle valve 20. This water is passed through line 21 to the distributor tube 22 and is injected into the lower part of the feeder through small parallel orifices 23. Thus the water only wets a small portion of the bed of calcium hypochlorite contained in the feeder, leaving the rest to serve as a gravity-feed supply. The distributor tube may be placed in any expedient manner which permits the water to contact only the lower portion of the bed of calcium hypochlorite and be suitably distributed therein. However it is advantageously placed in the side of the container and the water introduced horizontally in the form of fine streams from the outside so as to avoid the necessity of internal equipment which would interfere with the descending hypochlorite charge and cause arching of the charge. The resulting solution passes through a perforated plate 24, provided at a suitable distance from the bottom of the feeder. This plate 24 supports the bed of hypochlorite and forms a chamber below which may accumulate a backflow of solution without permitting the wetting of the bulk of the hypochlorite stored in the feeder. From this chamber the solution is fed through line 25 with stopcock 26 to the point of application.

The design principles of the present invention can generally be used advantageously when it is desired to dispense solutions of chemicals supplied in solid particulate form at accurately controlled rates which may be varied simply by controlling the solvent input rate. It is particularly useful in the application of solid calcium hypochlorite to bodies of moving liquids such as, for example, in treating water of swimming pools, water plants in small municipalities, bottling plants, dairies, cooling systems, etc., where the addition of a sterilizing agent is desirable. It also can be advantageously used in the treatment of industrial wastes to destroy color, odor, and toxic constituents, and for odor and bacterial control in sewage effluents. Pressed tablets of calcium hypochlorite are especially suitable in the present apparatus, but other shapes and sizes of particles may also be used. The apparatus is adaptable for dissolving and feeding other chemicals, for example, sodium fluoride in minor amounts for water supplies, polyphosphates and compositions containing them for water softening, soda ash furnished as briquettes or fused soda ash for adjusting the alkalinity of a treating solution, etc.

The materials of construction in contact with the solid or solutions of calcium hypochlorite are preferably resistant to its action. Particularly suitable for this purpose are a considerable number of plastic compounds such as, for example, Lucite which has the additional advantage of transparency. Other portions of the apparatus may be constructed of molded resins and of conventional materials including copper, brass, steel, etc.

The apparatus of the present invention can be fabricated at low cost compared to other dispensing equipment. It is of compact construction, can be quickly installed, requires a minimum of maintenance, is safe to use and involves no accident hazards. It requires the preparation of no stock solutions of the chemicals used. Once charged and set it can be depended upon to operate reliably without further attention until the charge of solid chemical is spent. With a suitable metering device controlling the inflow of water, the degree of treatment can be varied over wide limits and can be changed quickly to accommodate fluctuations in demand.

The following examples illustrate specific instances of operation of the apparatus of our invention.

*Example I*

A feeder was constructed according to the design pictured in the accompanying drawing, comprising a total height of 12½ inches, an inside diameter of 5⅝ inches, a perforated support plate located 2½ inches above the bottom and a distributor tube containing seven orifices of 0.0277 in diameter positioned 1½ inches above the perforated plate. This particular feeder was equipped with a flowmeter of the rotameter type having a range from 0–1500 cc./minute. The feeder was supplied with tablets of high test calcium hypochlorite. Results indicated that by means of this particular apparatus hypochlorite solutions could be dispensed accurately and reliably at rates from 0.1 lb. of available chlorine to 2.5 lbs. of available chlorine per hour using water at a pressure of not more than 30 lbs./in.$^2$ gage.

*Example II*

The unit described in Example I was installed across the recirculating pump of a swimming pool. By means of this apparatus using high test hypochlorite tablets the chlorine residual of the 65,000 gal. pool could be brought from 0 to 0.50 p. p. m. in 12 minutes. The operator of the pool, a non-technical man, quickly learned to use this feeding device to best advantage. Thus, after bringing the chlorine residual of his pool up to 0.50 p. p. m., experience quickly taught him how to set his flowmeter so that for any particular type of load a fairly constant residual could be maintained without further adjustment.

*Example III*

Another unit comprising the same design and dimensions described in Example I was installed across the recirculating pump of a 200,000 gal. pool. This operator preferred a low initial rate of dispensation which during the preliminary period built up the available chlorine content sufficient to accommodate the peak load and maintain an adequate residual at all times but without changing the flowmeter setting to maintain this residual throughout the duration of the swimming period.

We claim:

Apparatus for preparing and feeding aqueous hypochlorite solutions of controlled concentration from solid hypochlorite which comprises a vertically enlarged container with an upper opening for charging solid hypochlorite and a lower opening for withdrawing aqueous hypochlorite, a perforated support for a bed of the solid hypochlorite arranged within the said container and above its base and said lower opening, distributing means set in the side of said container above said perforated support, said distributing means containing a plurality of parallel openings for introducing fine parallel streams of water horizontally into said container from its side and distributing the water throughout the lower portion of the hypochlorite bed, means for metering variable amounts of water to said distributing means, and means for withdrawing and dispensing aqueous hypochlorite solution of desired concentration from said lower opening.

References Cited in the file of this patent

UNITED STATES PATENTS

| | | |
|---|---|---|
| 528,441 | Muller | Oct. 30, 1894 |
| 823,941 | Fetta | June 19, 1906 |
| 1,231,128 | Cartwright | June 26, 1917 |
| 1,409,248 | Sevcik | Mar. 14, 1922 |
| 1,862,238 | Roe et al. | June 7, 1932 |
| 1,908,102 | Arledter | May 9, 1933 |
| 2,584,395 | Marvel | Feb. 5, 1952 |

FOREIGN PATENTS

| | | |
|---|---|---|
| 10,394 | Great Britain | A. D. 1910 |